UNITED STATES PATENT OFFICE 2,656,297

**METHOD OF BONDING A BODY OF POLY-
ETHYLENE TO A SURFACE AND ADHE-
SIVES USED THEREFOR**

Howard G. Davis, Jr., Wellesley, William L. Durette, Cambridge, and Eric C. Johnson, Somerville, Mass., assignors to B. B. Chemical Co., Boston, Mass., a corporation of Massachusetts No Drawing. Application April 2, 1949,
Serial No. 85,272

15 Claims. (Cl. 154—139)

This invention relates to adhesive and coating compositions and to methods of making such coatings. The invention is particularly directed to adhesive compositions capable of forming strong permanent bonds between polyethylene sheet material and surfaces of polyethylene or other material.

Polyethylene plastic material possesses many desirable characteristics including its inertness to most chemicals and solvents at ordinary temperatures, its resistance to electricity, its toughness and its flexibility. By reason of these and other properties it has been desired to employ sheet polyethylene in numerous relations where the bonding of the sheet to itself or to other surfaces is required.

Many difficulties have been encountered in the bonding of sheet polyethylene. The waxy paraffin-like character of polyethylene surfaces interferes with adhesion by most of the commonly employed adhesive or coating agents. Additionally, it has been observed that certain adhesives form a bond which is of acceptable strength for a short period after completion but which, within a period of at most a few days, weakens to such an extent that the bonded surfaces may fall apart. Also, while polyethylene is not dissolved by most solvents employed in adhesives, many of these solvents do enter and swell the polyethylene material. In the coating or bonding of polyethylene film this swelling wrinkles and causes curling of the film. The use of adhesives or coating compositions comprising polyethylene for the bonding or coating of polyethylene or other materials has been considered not practicable for the reasons that while polyethylene can be dissolved in certain solvents at elevated temperatures, the solutions gel when cooled.

It is a feature of the present invention to provide a polyethylene material in a form which is soluble in organic solvents to form a non-gelling solution.

It is a further feature of the present invention to provide adhesive or coating compositions for polyethylene bodies which will form strong permanent bonds with the surfaces of such bodies and which will not adversely affect the coated or adhered polyethylene surface.

It is an additional feature of the present invention to provide a novel method for preparing an adhesive or coating composition comprising polyethylene.

We have made the remarkable discovery that compositions comprising polyethylene in a novel dispersed form in butyl rubber are soluble in organic solvents to form non-gelling solutions. We have found additionally that organic solvent solutions of the dispersion of polyethylene in butyl rubber together with low molecular weight polyisobutylene and anti-oxidant materials possess excellent adhesive properties for forming permanent bonds with polyethylene surfaces. Preparation, according to the present invention, of compositions possessing these properties involves a novel hot and cold milling or working of polyethylene with butyl rubber to prepare a novel polyethylene material which is readily dispersible in volatile organic solvents, and which may be combined with further components to form adhesive or coating compositions capable of easy application by conventional methods.

According to the present invention, polyethylene is brought to dispersible form by working it with "butyl rubber," i. e., a synthetic rubber prepared by copolymerization of isobutylene and small percentages of butadiene or other dienes such as isoprene, to form an intimate mixture of which it is believed that the butyl rubber forms the outer phase and the polyethylene the inner phase. This special relationship between the butyl rubber and polyethylene is obtained according to the method of the present invention by working from one to four parts of butyl rubber and from four to one parts of polyethylene, preferably equal parts of polyethylene and butyl rubber, together in known plastic or rubber working equipment, suitably a Banbury mixer at a temperature above the melting point of the polyethylene. An intimate mixture of the polyethylene and butyl rubber is formed by this milling or working and is discharged and sheeted out on cold rolls. The sheeted mixture is permitted to stand and cool to room temperature and preferably is permitted to stand overnight. In this stage the sheets have a boardy feel and are substantially insoluble in organic solvents at room temperature. The sheets are then milled on a cold mill and are again sheeted out. The product of this second milling is soft and plastic and is soluble in organic solvents preferably aromatic hydrocarbon solvents to form a stable solution. It is applicants' belief that in this cold milling operation the butyl rubber forms a continuous external phase in which the polyethylene is present in dispersed form and that the solvent in effect forms a solution of a butyl rubber which carries the polyethylene and maintains it in dispersed form. It is to be understood that applicants do not wish to be bound by this theory since the novel polyethylene-containing liquid is obtained by organic solvent action on the material thus formed.

Preferred polyethylene resins for use in forming the novel "soluble" composition may have molecular weights ranging from 10,000 to 20,000 and have melting points of about 225° F. or somewhat above. Any of the known butyl rubbers such as the materials known as GRI-70 and GRI-R14 may be used. Using these materials, the first working may be carried out by subjecting the butyl rubber to a short preliminary working with the apparatus, e. g., a Banbury mixer, at a temperature of about 225° F. and then adding and kneading in the polyethylene. The temperature is observed to rise somewhat with continued working of the mixture and a satisfactory mixing is usually obtained in from seven to ten minutes. Further working is not harmful but is not necessary and after this period the mixture is discharged and sheeted out on cold rolls. After standing and cooling, the sheets are milled on a cold mill for a period of from 10 to 20 minutes. During this milling the temperature is maintained below the melting point of the polyethylene, usually at not over 160° F. and preferably not over 130° F.

In the preparation of an adhesive, the cold-milled material is introduced into a conventional mixer such as a Read mixer or a WP mixer and is dissolved in an organic solvent, preferably a volatile aromatic hydrocarbon solvent such as toluol, xylol or naphtha together with the remaining components which will make up the adhesive or coating composition. Further additional components which may be included are additional butyl rubber if desired, a low molecular weight polymer of isobutylene, an anti-oxidant, thermoplastic resinous material such as oil-soluble terpene polymer resins, and oil-soluble non-heat-reactive phenolic resins. Suitable low molecular weight polymers of isobutylene are those which have molecular weights ranging from about 3000 to about 15,000 including the commercial materials known as Vistac #1 and Vistac #4. Anti-oxidants are an important component of adhesive compositions for bonding polyethylene sheet materials since it has been found that the bonds obtained with adhesive compositions which do not include suitable anti-oxidants deteriorate rapidly upon exposure to sunlight. Conventional rubber anti-oxidants may be used. It is preferred to use anti-oxidants which do not cause discoloration; and quinone anti-oxidants such as hydroquinone monobenzyl ether or secondary amine anti-oxidants such as a mixture of mono- and di-heptyl diphenyl amines have been found very satisfactory.

Preferred oil-soluble terpene resins are those having a melting point range of from 50° F. to 150° F.

It has been found that effective anti-oxidant properties are possessed by certain of the additional resinous materials. For example, an oil-soluble non-heat-reactive 100% phenol aldehyde resin known as Amberol ST-137X which has a specific gravity of 1.04, a melting point of from 75 to 95° C. and an acid number of less than 50, and an oil-soluble rosin modified phenol formaldehyde resin known as Amberol M-93 which has a specific gravity of 1.08, a melting point of 172° to 180° C. and an acid number of 12 to 18 have been found to possess anti-oxidant properties such that it is unnecessary to employ separate anti-oxidants in adhesive compositions according to the present invention which includes these resins. The Amberol resins are obtained from the Rohm and Haas Co. of Philadelphia, Pa.

In the compositions of the present invention it is important that the polyethylene and butyl rubber be present in the ratio of from 4 to 1 to 1 to 4. For adhesive and coating compositions to be used with polyethylene sheet material it is important that the remaining components be present within certain ranges of proportions with respect to the total weight of butyl rubber and polyethylene. Based upon 100 parts by weight of the mixture of polyethylene and butyl rubber, such compositions may comprise from 40 to 126 parts by weight and preferably from 47 to 63 parts by weight of the low molecular weight polymer of isobutylene and from ½ to 4 parts by weight of an anti-oxidant where the composition does not include resins having anti-oxidant properties. The composition will ordinarily include from 10 parts to 98 parts by weight and preferably 10 parts to 50 parts by weight of oil-soluble thermoplastic resin; and it has been found that the proportion of resin should in general not exceed one part by weight to from one to four parts by weight of the polymer of isobutylene. The quantity of solvent employed for dissolving the composition should be such as to provide a solids content of from 20% to 50% for a brush application and from 40% to 80% for application by other spreading means such as a knife.

In the bonding of polyethylene material, for example polyethylene sheet material, the cement is spread, e. g., by brushing or knife spreading, on the surface to which the polyethylene is to be adhered. The cement is permitted to dry and the polyethylene sheet material is then pressed firmly against the dried film of cement as by a hand roller. The cement may be dry enough for adhesion within a period of one hour, and will retain its ability to bond polyethylene for a period of at least 24 hours.

While the composition has been described primarily in its use as an adhesive for polyethylene, it will be understood that it may be compounded with pigments or dyes for employment as a coating composition for polyethylene. The pigmented or unpigmented composition may be used as a coating for polyethylene or other surfaces.

The following examples are given to assist in understanding the invention, but it is to be understood that the invention is not restricted to the proportions, or specific reagents, or details of procedure recited in the examples.

*Example I.*—Fifty (50) parts of butyl rubber (GRI-70) were introduced into a Banbury mixer which had been brought to a temperature of 225° F. and were worked therein for one minute. Fifty (50) parts of a polyethylene material having a molecular weight of approximately 19,000 (Polyethylene DYNH) were then introduced into the Banbury and mixing was continued for seven minutes, during which time the temperature of the Banbury increased slightly. The mixed material was dumped and sheeted out on a cold mill. The sheeted material was held overnight to cool and was then remilled for ten minutes on a cold mill at a temperature maintained below 130° F. and was sheeted out. The product at this stage was a soft and pliable sheet material.

Eighty (80) parts of toluol were introduced into a Read mixer and 34 parts of butyl rubber were introduced into the mixer and dissolved in the solvent. Sixty-six (66) parts of the cold milled mixture of butyl rubber and polyethylene were then added and the mixture churned until a smooth liquid was obtained. At this point 63 parts of a low molecular weight polyisobutylene (Vistac #1), 40 parts by weight of an oil-soluble thermoplastic terpene resin (Piccolyte S-115) and 4 parts of hydroquinone monobenzyl ether were added and mixing was continued until a smooth liquid was obtained. Piccolite is a B-pinene polymer, and the S-115 indicates that its melting point is 115° C. The resulting liquid composition was found very satisfactory for brush application to surfaces such as the inside of a tank car for adhering sheet polyethylene to provide a lining for the car.

*Example II.*—Employing the procedure disclosed in Example I, there was prepared a mixture comprising 66 parts of the cold milled butyl rubber-polyethylene composition, 34 additional parts of butyl rubber, 63 parts of low molecular weight polyisobutylene (Vistac #4), 40 parts by weight of an oil-soluble non-heat-reactive phenol aldehyde resin (Amberol ST-137X) and 80 parts by weight of xylol.

The composition was suitable for the bonding of polyethylene sheets to varied surfaces and itself and gave satisfactory bonds, the film of adhesive being somewhat more cloudy than the film formed from the composition of Example I.

*Example III.*—Thirty (30) parts of butyl rubber (GRI-70) were introduced into a Banbury mixer which had been brought to a temperature of 225° F. and were worked therein for one minute. Ten (10) parts of a polyethylene material having a molecular weight of approximately 19,000 (Polyethylene DYNH) were then introduced into the Banbury and mixing was continued for seven minutes during which time the temperature of the Banbury increased slightly. The mixed material was dumped. The mixed material was held overnight to cool and then remilled for ten minutes on a cold mill at a temperature maintained below 130° F. and sheeted out. The product at this stage was a soft and pliable sheet material. Fifty-five parts of Stoddard solvent were introduced into a Read mixer and the cold milled mixture of butyl rubber and polyethylene was then added together with 20 parts of an oil-soluble thermoplastic terpene resin (Piccolyte S-115) and 0.5 part of hydroquinone monobenzyl ether. Mixing was continued until a smooth liquid was obtained. This liquid was found satisfactory as a cement for use in flocking of cloth.

Having thus described our invention, what we claim as new and desire to secure by Letters Patent of the United States is:

1. A polyethylene-containing composition readily dispersible in organic solvents to form stable non-gelling liquids, said composition consisting essentially of the product obtained by milling together polyethylene having a molecular weight of from 10,000 to 20,000 and synthetic rubber copolymer of isobutylene and a small proportion of a diene at a temperature above the melting point of the polyethylene, sheeting out the milled composition, cooling the sheeted mixture and remilling the composition at a temperature below the melting point of the polyethylene, the polyethylene and said synthetic rubber copolymer being in the ratio of from 1 to 4 to 4 to 1.

2. A composition capable of forming a strong bond with the surface of a body of polymerized polyethylene comprising an intimate mixture of the product obtained by milling together polyethylene having a molecular weight of from 10,000 to 20,000 and synthetic rubber copolymer of isobutylene and a small proportion of a diene at a temperature above the melting point of the polyethylene, cooling the milled composition and remilling the composition at a temperature below the melting point of the polyethylene, the polyethylene and said synthetic rubber copolymer being in the ratio of from 1 to 4 to 4 to 1, a polymer of isobutylene having a molecular weight of from 3,000 to 15,000 and an anti-oxidant, said composition comprising from 40 to 126 parts by weight of isobutylene polymer with 100 parts combined weight of polyethylene and said synthetic rubber copolymer.

3. A composition for forming a strongly adherent film on the surface of a body of polyethylene comprising a volatile aromatic hydrocarbon solvent solution containing the product obtained by milling together polyethylene having a molecular weight of from 10,000 to 20,000 and synthetic rubber copolymer of isobutylene and a small proportion of a diene at a temperature above the melting point of the polyethylene, sheeting out the milled mixture, cooling the sheeted mixture and remilling the sheeted mixture at a temperature below the melting point of the polyethylene, the polyethylene and said synthetic rubber copolymer being in the ratio of from 1 to 4 to 4 to 1, a polymer of isobutylene having a molecular weight of from 3,000 to 15,000, an oil-soluble thermoplastic resin and an anti-oxidant, said composition comprising from 40 to 126 parts by weight of isobutylene polymer, from 10 to 98 parts by weight of said thermoplastic resin and from ½ to 4 parts by weight of antioxidant with 100 parts combined weight of polyethylene and said synthetic rubber copolymer.

4. A composition for forming a strongly adherent film on the surface of a body of polyethylene comprising a volatile aromatic hydrocarbon solvent solution containing the product obtained by milling together polyethylene having a molecular weight of from 10,000 to 20,000 and synthetic rubber copolymer of isobutylene and a small proportion of a diene at a temperature above the melting point of the polyethylene, sheeting out the milled mixture, cooling the sheeted mixture to room temperature and remilling the sheeted mixture at a temperature below the melting point of the polyethylene, the polyethylene and said synthetic rubber copolymer being in the ratio of from 1 to 4 to 4 to 1, a polymer of isobutylene having a molecular weight of from 3,000 to 15,000, a thermoplastic B-pinene polymer resin and an anti-oxidant, said composition comprising from 40 to 126 parts by weight of isobutylene polymer, from 10 to 98 parts by weight of said thermoplastic resin and from ½ to 4 parts by weight of antioxidant with 100 parts combined weight of polyethylene and said synthetic rubber copolymer.

5. A composition for forming a strongly adherent film on the surface of a body of polyethylene comprising a volatile aromatic hydrocarbon solvent solution containing the product obtained by milling together polyethylene having a molecular weight of from 10,000 to 20,000 and synthetic rubber copolymer of isobutylene and a small proportion of a diene at a temperature above the melting point of the polyethylene, sheeting out the milled mixture, cooling the sheeted mixture to room temperature and remilling the sheeted mixture at a temperature below the melting point of the polyethylene, the polyethylene and said synthetic rubber copolymer being in the ratio of from 1 to 4 to 4 to 1, a polymer of isobutylene having a molecular weight of from 3,000 to 15,000 and a thermoplastic oil-soluble phenol formaldehyde resin having a specific gravity of about 1.04, a melting point of from 70° C. to 95° C. and an acid number below 50, said composition comprising from 40 to 126 parts by weight of isobutylene polymer, from 10 to 98 parts by weight of said thermoplastic resin and from ½ to 4 parts by weight of antioxidant with 100 parts combined weight of polyethylene and said synthetic rubber copolymer.

6. An adhesive for bonding polyethylene sheet material to itself and to other surfaces comprising a volatile aromatic hydrocarbon solvent solution containing 100 parts by weight of an intimate mixture of from 20 to 80 parts by weight of polyethylene having a molecular weight of from 10,000 to 20,000 in from 80 to 20 parts by weight of synthetic rubber copolymer of isobutylene and a small proportion of a diene, the polyethylene being in the relationship obtained by milling the polyethylene and at least a portion of the said synthetic rubber copolymer at a temperature above the melting point of the polyethylene to form an intimate mixture, sheeting out the milled mixture, cooling the sheeted mixture to room temperature and remilling the sheeted mixture at a temperature below the melting point of the polyethylene, from 40 parts to 126 parts by weight of a polymer of isobutylene having a molecular weight of from 3,000 to 15,000, and from one-half to four parts of an anti-oxidant.

7. An adhesive for bonding polyethylene sheet material to itself and to other surfaces comprising a volatile aromatic hydrocarbon solvent solution containing 100 parts by weight of an intimate mixture of from 20 to 80 parts by weight of polyethylene having a molecular weight of from 10,000 to 20,000 with from 80 to 20 parts by weight of synthetic rubber copolymer of isobutylene and a small proportion of a diene, the polyethylene being in the relationship obtained by milling the polyethylene and at least a portion of the said synthetic rubber copolymer at a temperature above the melting point of the polyethylene, sheeting out the milled mixture, cooling the sheeted mixture to room temperature and remilling the sheeted mixture at a temperature below the melting point of the polyethylene, the polyethylene and said synthetic rubber copolymer in the milled mixture being in the ratio of from 1 to 4 to 4 to 1, from 40 to 126 parts by weight of a polymer of isobutylene having a molecular weight of from 3,000 to 15,000, from 10 to 98 parts by weight of an oil-soluble thermoplastic B-pinene polymer resin having a melting point of from 50° to 150° F., the ratio of the polymer of isobutylene to the thermoplastic B-pinene polymer resin being from 1 to 1 to 4 to 1, and from ½ to 4 parts of an anti-oxidant, the solids content of the adhesive being from 20% to 80%.

8. An adhesive for bonding polyethylene sheet material to itself and to other surfaces comprising a volatile aromatic hydrocarbon solvent solution containing 100 parts by weight of an intimate mixture of from 20 to 80 parts by weight of polyethylene having a molecular weight of from 10,000 to 20,000 in from 80 to 20 parts by weight of synthetic rubber copolymer of isobutylene and a small proportion of a diene, the polyethylene being in the relationship obtained by milling the polyethylene and at least a portion of said synthetic rubber copolymer at a temperature above the melting point of the polyethylene, sheeting out the milled mixture, cooling the sheeted mixture to room temperature and remilling the sheeted mixture at a temperature below the melting point of the polyethylene, the polyethylene and said synthetic rubber copolymer in the milled mixture being in the ratio of from 1 to 4 to 4 to 1, from 40 to 126 parts by weight of a polymer of isobutylene having a molecular weight of from 3,000 to 15,000, from 10 to 98 parts by weight of a thermoplastic oil-soluble phenol formaldehyde resin having a specific gravity of 1.04, a melting point of from 70° to 95° C. and an acid number of less than 50, the solids content of the adhesive being from 20% to 80%.

9. An adhesive for bonding polyethylene sheet material to itself and to other surfaces comprising a volatile aromatic hydrocarbon solvent solution containing 100 parts by weight of an intimate mixture of from 20 to 80 parts by weight of polyethylene having a molecular weight of from 10,000 to 20,000 in from 80 to 20 parts by weight of synthetic rubber copolymer of isobutylene and a small proportion of a diene, the polyethylene being in the relationship obtained by milling the polyethylene and at least a portion of said synthetic rubber copolymer at a temperature above the melting point of the polyethylene, sheeting out the milled mixture, cooling the sheeted mixture to room temperature and remilling the sheeted mixture at a temperature below the melting point of the polyethylene, the polyethylene and said synthetic rubber copolymer in the milled mixture being in the ratio of from 1 to 4 to 4 to 1, from 40 to 126 parts by weight of a polymer of isobutylene having a molecular weight of from 3,000 to 15,000, from 10 to 98 parts by weight of a thermoplastic oil-soluble rosin modified phenol formaldehyde resin having a specific gravity of 1.08, a melting point of from 172° to 180° C. and an acid number of from 12 to 18, the solids content of the adhesive being from 20% to 80%.

10. The method of preparing a polyethylene-containing mixture dispersible in an organic solvent comprising the steps of milling polyethylene having a molecular weight of from 10,000 to 20,000 and synthetic rubber copolymer of isobutylene and a small proportion of a diene at a temperature above the melting point of the polyethylene, sheeting out the milled mixture, cooling the sheeted mixture and remilling the sheeted mixture at a temperature below the melting point of the polyethylene.

11. The method of preparing a polyethylene-containing mixture dispersible in an organic solvent comprising the steps of milling polyethylene having a molecular weight of from 10,000 to 20,000 and synthetic rubber copolymer of isobutylene and a small proportion of a diene at a temperature above the melting point of the polyethylene, sheeting out the milled mixture, cooling the sheeted mixture and remilling the sheeted mixture at a temperature below the melting point of the polyethylene, the polyethylene and said synthetic rubber copolymer being in the ratio of from 1 to 4 to 4 to 1.

12. The method of preparing a coating composition which comprises the steps of preparing a dispersion of polyethylene having a molecular weight of from 10,000 to 20,000 in synthetic rubber copolymer of isobutylene and a small proportion of a diene by milling said synthetic rubber copolymer at a temperature above the melting point of the polyethylene, adding polyethylene to the synthetic rubber copolymer of isobutylene and a small proportion of a diene and continuing milling to effect a thorough mixture of the two components, sheeting out the mixture on a cold roll, cooling the sheeted material to room temperature, and remilling the sheeted material for a period of from 10 to 20 minutes at a temperature below 150° F., and mixing the remilled material with a volatile organic solvent to form a stable solution of said synthetic rubber copolymer carrying said dispersed polyethylene.

13. The method of preparing a coating composition capable of adhering strongly to the surfaces of polyethylene bodies which comprises the steps of preparing a dispersion of polyethylene having a molecular weight of from 10,000 to 20,000 in synthetic rubber copolymer of isobutylene and a small proportion of a diene by milling said synthetic rubber copolymer at a temperature above the melting point of the polyethylene, adding polyethylene to the said synthetic rubber copolymer and continuing milling at a temperature above the melting point of the polyethylene to effect a thorough mixture of the two components, sheeting out the mixture on a cold roll, cooling the sheeted material to room temperature, remilling the sheeted material for a period of from 10 to 20 minutes at a temperature below 150° F., the polyethylene and said synthetic rubber copolymer being in the ratio of from 1 to 4 to 4 to 1, and mixing the remilled material with a volatile aromatic solvent to form a stable solution of said synthetic rubber copolymer carrying said dispersed polyethylene and also incorporating a polymer of isobutylene having a molecular weight of from 3,000 to 15,000 and an anti-oxidant, said composition comprising from 40 to 126 parts by weight of isobutylene polymer with 100 parts combined weight of polyethylene and said synthetic rubber copolymer.

14. The method of preparing a coating composition which comprises the steps of preparing a dispersion of polyethylene having a molecular weight of from 10,000 to 20,000 and synthetic rubber copolymer of isobutylene and a small proportion of a diene by milling said synthetic rubber copolymer at a temperature above the melting point of the polyethylene, adding polyethylene to the said synthetic rubber copolymer and continuing milling at a temperature above the melting point of the polyethylene to effect a thorough mixture of the two components, sheeting out the mixture on a cold roll, cooling the sheeted material to room temperature, and remilling the sheeted material for a period of from 10 to 20 minutes at a temperature below 150° F. and mixing the remilled material with a volatile organic solvent to form a stable solution of said synthetic rubber copolymer carrying said dispersed polyethylene, the polyethylene and said synthetic rubber copolymer being in the ratio of from 1 to 4 to 4 to 1.

15. The method of bonding a body of polyethylene to a surface which comprises coating said surface with a volatile aromatic hydrocarbon solvent solution containing the product obtained by milling together polyethylene having a molecular weight of from 10,000 to 20,000 and synthetic rubber copolymer of isobutylene and a small proportion of a diene at a temperature above the melting point of the polyethylene, sheeting out the milled mixture, cooling the sheeted mixture to room temperature and remilling the sheeted mixture at a temperature below the melting point of the polyethylene, a polymer of isobutylene having a molecular weight of from 3,000 to 15,000, an oil-soluble thermoplastic resin and an anti-oxidant, the polyethylene and the said synthetic rubber copolymer being in the ratio of from 1 to 4 to 4 to 1, drying the film and pressing the polyethylene body against the dried film.

HOWARD G. DAVIS, Jr.
WILLIAM L. DURETTE.
ERIC C. JOHNSON.

References Cited in the file of this patent

UNITED STATES PATENTS

| Number | Name | Date |
|---|---|---|
| 2,339,958 | Sparks | Jan. 25, 1944 |
| 2,340,452 | Child et al. | Feb. 1, 1944 |
| 2,369,471 | Latham | Feb. 13, 1945 |
| 2,383,839 | Beekley | Aug. 28, 1945 |
| 2,395,419 | Mitchell | Feb. 26, 1946 |
| 2,451,865 | O'Brien | Oct. 19, 1948 |
| 2,459,891 | Nelson | Jan. 25, 1949 |
| 2,462,977 | Kitchin et al. | Mar. 1, 1949 |
| 2,543,229 | Chapman | Feb. 27, 1951 |
| 2,569,540 | Selby | Oct. 2, 1951 |

FOREIGN PATENTS

| Number | Country | Date |
|---|---|---|
| 112,875 | Australia | Apr. 24, 1941 |
| 613,018 | Great Britain | Nov. 22, 1948 |